Jan. ., ....  
3,116,660

HIGH SPEED KERR CELL FRAMING CAMERA

Filed March 3, 1961

INVENTORS  
WILLIS C. GOSS  
LEROY F. GILLEY  
BY  
ATTORNEY

Jan. 7, 1964     W. C. GOSS ETAL     3,116,660
HIGH SPEED KERR CELL FRAMING CAMERA
Filed March 3, 1961     3 Sheets-Sheet 2
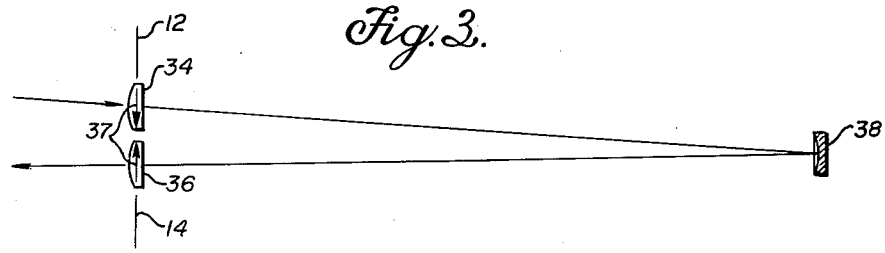
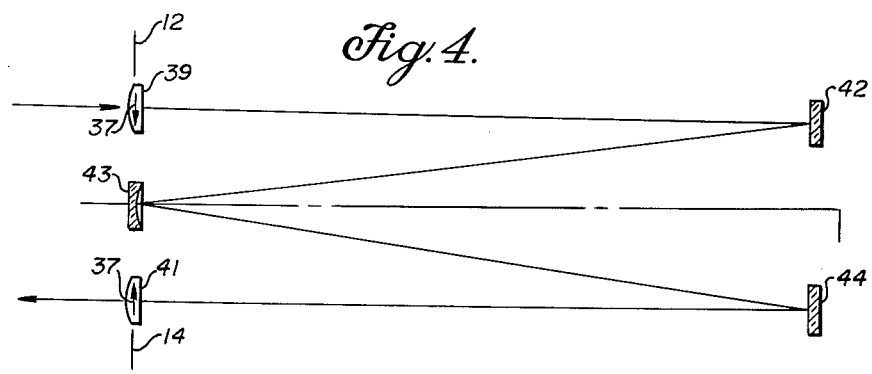
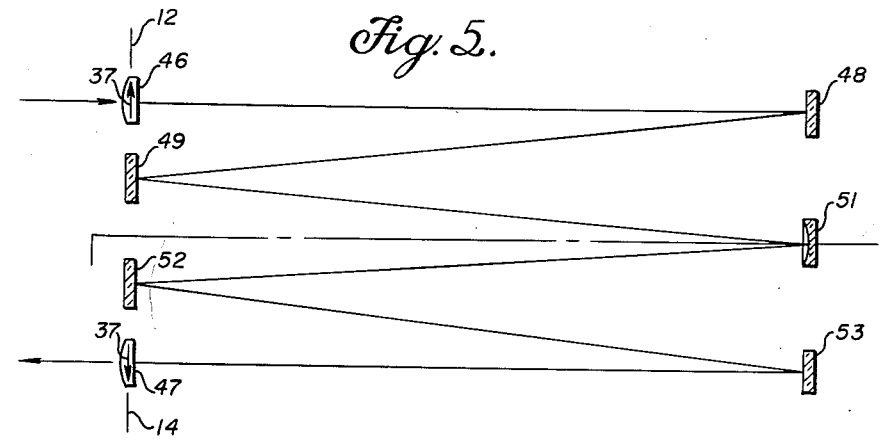
INVENTORS
WILLIS C. GOSS
LEROY F. GILLEY
BY
ATTORNEY Jan. 7, 1964

W. C. GOSS ETAL 3,116,660

HIGH SPEED KERR CELL FRAMING CAMERA

Filed March 3, 1961

INVENTORS
WILLIS C. GOSS
LEROY F. GILLEY
BY
ATTORNEY

United States Patent Office 3,116,660
Patented Jan. 7, 1964

3,116,660
HIGH SPEED KERR CELL FRAMING CAMERA
Willis C. Goss and Le Roy F. Gilley, Livermore, Calif., assignors to the United States of America as represented by the United States Atomic Energy Commission
Filed Mar. 3, 1961, Ser. No. 93,274
6 Claims. (Cl. 88—16)

The present invention relates to high speed framing cameras and, in particular, to a high speed camera employing a Kerr cell shutter and novel optical delay system with no moving parts therein.

Research has progressed to such a state where, generally speaking, inadequate photographic instrumentation exists. Up to the present time the rotating mirror framing camera, operating with speeds of from one-third to three microseconds interframe time, has proven adequate for hydrodynamic event instrumentation. However, at the present time hydrodynamic research is being pursued at elevated temperatures where resulting higher energy densities are accompanied by greater particle and shock velocities and more rapid phase transitions. These more rapid phase transitions are, in turn, generally accompanied by smaller scaling of the physical events, further necessitating the use of microscale photography and photographic equipment. Microscale events at normal hydrodynamic temperatures occur at a rate which makes an interframe time of $10^{-8}$ seconds very desirable at this time. At higher hydrodynamic temperatures, even faster instrumentation will be necessary.

Until the present time, cameras of the rotating mirror type have been the preferred photographic means of recording high-speed hydrodynamic events. However, the Schardin limit, which relates the rotor tensile strength of a rotating mirror camera to the picture information lines presented per unit time, indicates that a limit exists to the framing rate of such rotating mirror cameras. This limit is an interframe time of $5 \times 10^{-8}$, using the best available steel and maintaining a one-hundred information line picture. Such a picture is a decidedly poor one for the analysis purposes such as desired in the present state of research. To obtain faster framing sequence and simultaneously retain a good quality picture, a new, or at least different, framing means other than the rotating mirror is therefore necessary.

The present invention, on the other hand, overcomes the foregoing shortcomings by providing a camera with no moving parts, but which, instead, employs a novel combination of a Kerr cell shutter means, an optical relay delay system means, and a microscopic or telescopic optical means of looking at the event and of forming images thereof. This novel combination is used in conjunction with conventional electrical synchronizing circuits and a camera for actually photographing the event seen by the image forming means. Thus, in the present invention, the interframe time limitations are imposed, not by physical rotating limitations, but, instead, by the much less severe electrical limitations of the Kerr cell shutter and synchronizing electronic circuits.

Therefore, it is an object of the present invention to provide an improved high speed framing camera for photographing any very high speed event, either by means of supplemental lighting or by the light emitted by the event itself.

It is another object of the present invention to provide a camera capable of selectively photographing at least six frames within $9 \times 10^{-8}$ seconds during any such time interval of the occurring event.

It is still another object of the present invention to provide a camera wherein a series of consecutive picture frames is recorded of a rapidly occurring event where the interframe times are obtained by a plurality of optical paths of successively increasing length through which images of the event are passed.

It is yet another object of the present invention to provide a camera for photographing both microscopic events and large scale distant events.

Another object of the present invention is to provide a high speed framing camera with no moving mechanical parts, i.e., rotating mirrors, prisms, or shutters.

A further object of the present invention is to provide a camera utilizing a Kerr cell shutter wherein a plurality of picture frames may be recorded with one opening of such Kerr cell shutter.

Additional objects and advantages of the present invention will become apparent by referring to the following specification and claims taken in conjunction with the accompanying drawings, of which:

Figure 7:
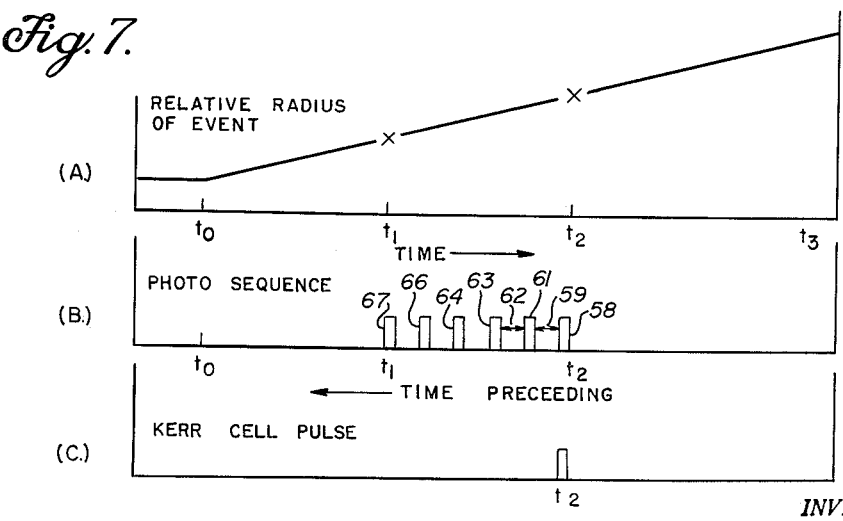

FIGURES 3, 4, 5, and 6 show in detail the optical relay delay paths of four delay channels of the optical delay system of the camera;

FIGURE 7a shows a plot of the relative radius of an event, i.e., exploding wire, being photographed versus time;

FIGURE 7b shows a plot of the sequence of photos or frames with respect to time and as related to the plot of FIGURE 7a; and FIGURE 7c shows the time of Kerr cell shutter exposure with respect to the occurring event and photo sequence of FIGURES 7a and 7b, respectively.

Briefly, the use of Kerr cells as shutter means in photographic equipment is most desirable for attaining interframe times of less than $10^{-8}$ seconds, such speeds being desirable in the present state of scientific research. Although the use of Kerr cells is known in the art of photography for use as a photographic shutter, the present invention employs the Kerr cell in a new and useful manner in combination with a novel optical delay system and a conventional electrical synchronizing circuit and camera to facilitate photographing of extremely high speed events. More specifically, the present invention records, e.g., a plurality of frames or photos, e.g., six, during one exposure time of the Kerr cell shutter, such time being $5 \times 10^{-9}$ seconds. The time delay between frames is introduced, not by a rapid sequence of shutter exposures as the event progresses as in the case of conventional rotating mirror cameras, but, instead, by actually increasing the time it takes the successive images to reach the camera by means of an optical relay delay system, wherein each image to be photographed is relayed and successively delayed in increasing time increments by an individual optical path in the system. This sequence of photographs or frames is then photographed simultaneously during one Kerr cell exposure. The present invention in its preferred embodiment has an interframe time of $1.5 \times 10^{-8}$ seconds between each of six frames photographed, and has a Kerr cell exposure time of $0.5 \times 10^{-8}$ seconds. Thus, a series of six photographs are taken of a rapidly occurring event at any period of time during progression of the event where the series of photographs are recorded by a camera at the end of such period of time with one Kerr cell shutter exposure of $0.5 \times 10^{-8}$ seconds.

Figure 1:
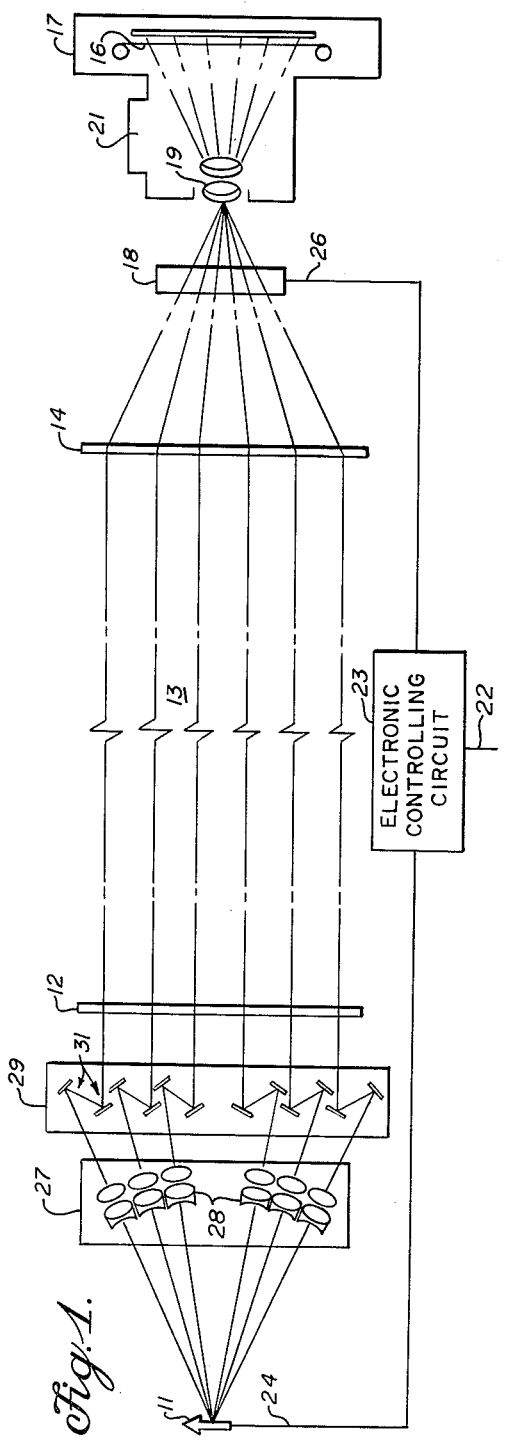
FIGURE 1 shows in block form a simplified optical layout of the preferred embodiment of the present invention in conjunction with the phenomenon to be photographed whereby six photos may be taken by means of six separate optical image paths.

The present invention may be best understood by referring now to the accompanying drawings and, in particular, to FIGURE 1 where there is shown a high speed Kerr cell framing camera used for photographing an event 11. To facilitate the description of the present invention, an image plane 12 locates the points of entry of a plurality of image paths from the event into an optical relay delay system 13, and, more particularly, represents a plane at which each of six image paths are focused to form first images of the event 11. The plane 12 is physically comprised of various optical lenses and mirrors of the delay system 13 and is further described below. The relay delay system 13 is disposed between such first plane 12 and a second similar plane 14 where said plane 14 represents the point of exit from the delay system 13 for each image path and also comprises various optical lenses and mirrors. The relay delay system 13 maintains image integrity and delivers a set of six similar images from the entrance to the exit point therein, where each image is transmitted with varying time delays. Such time delays of the image paths are provided by increasing each of the six optical image paths in the present invention a predetermined amount within the optical delay system 13, by adding additional optical components to each succeeding delay path. All six paths terminate upon a single film plane 16 of a conventional 35 mm. camera 17; thus, the images transmitted along each path form coplanar, contiguous pictures upon the single film plane 16. All six images are simultaneously photographed by means of a single shutter exposure of a Kerr cell 18 interposed between the exit plane 14 of the delay system and the camera 17. More specifically, the camera 17 is used to accomplish imaging, viewing, focusing, shutternig, film advance, and, particularly, comprises a conventional camera lens 19 located against the Kerr cell 18 so as to view the composite image directly. A viewing attachment 21 or reflex mirror view finder is coupled with the lens 19 to give direct viewing of what will appear on the film plane. The preferred embodiment of the present invention utilizes a 35 mm. camera with a 125 mm. camera lens and reflex viewer, but it is to be understood that any suitable camera means for photographing the event may be used in place of the camera as described herein.

It is to be understood that there are other shutter means available for use in place of the Kerr cell shutter utilized in the preferred embodiment of the present invention. For example, any light amplifier tube of like operating speed which is capable of being shuttered, may be used. Likewise, any means of recording the delayed images can be used in place of the conventional 35 mm. camera herein employed (e.g., an oil-film or electrostatic light image recording means).

Between plane 12 and the occurring event 11 is an image forming system 27 disposed in such a configuration about the event as to allow the camera system to view same. Since the main use of the present invention is to photograph microscopic events, the preferred embodiment, thereof, utilizes six microscopic objectives 28 as the image forming system 27. When utilizing such an image forming system 27, it is necessary that the paths seen and transmitted by each of the microscope objectives must enter the plane 12 at a suitable location and with proper direction, thus necessitating an appropriate image path directing, mirror system 29 disposed between the system 27 and the plane 12.

More particularly, system 27 comprises sets of microscope objectives, each arranged in a radius of a circle about the occurring event 11 (where the event is at the center of the circle) in order to focus simultaneously on the event. The path of the image, as seen by each of the six microscope objectives, is magnified and transmitted into the mirror system 29. Such mirror system comprises, for example, at least two reflecting mirrors 31 in each path where such mirrors lend flexibility in introducing the image paths to the plane 12. That is, the paths must be introduced to delay system 13 in a particular position and with such direction (e.g., parallel) as to be subsequently utilized in the predetermined relation of delay paths described in more detail infra.

As an example of the microscopic event viewing system used in the preferred embodiment of the present invention, the former may comprise F/4, 48 millimeter focal length objectives backed up with segments from 40-inch telescopic objectives, the combination giving a prompt magnification of 2× and an f/number of $\frac{1}{80}$, to be presented to the delay system 13. The image is demagnified by a factor of 8 upon leaving the relay system due to the focal lengths of the camera and exit lenses, and the distance therebetween. Thus, total magnification at the film plane of the camera 17 is then 2.5 to 1 and the f number is $f/10$.

Figure 2:
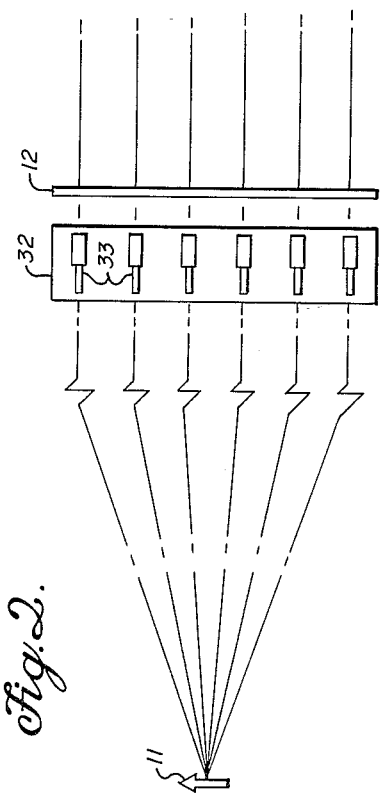
FIGURE 2 shows an optical telescopic viewing or image forming system which may be employed in the camera illustrated by the block layout of FIGURE 1 to facilitate photographing of a distant event.

Referring now to FIGURE 2, there is shown a modified form of the present invention as adapted to photograph a fairly large scale, more distant event such as, for example, a nuclear explosion. More specifically, the image forming system 27 and mirror system 29, of previous mention, are replaced by a telescopic viewing system 32 which comprises six individual, parallel telescope objectives 33 spaced so as to focus images of the distant event 11 directly on the plane 12 at predetermined points thereon. Since the event is viewed at a distance, the paths seen by the prelocated telescope objectives are very close to being parallel and are properly located for further relaying in the delay system 13 without requirement of a redirecting system of mirrors such as mirror system 29.

Considering now in greater detail the relay delay system 13 of previous mention, it should be noted that this system must relay the six separate image paths received thereby with respective time delayed transmissions that successively increase with increasing path number in the chosen increments of $1.5 \times 10^{-8}$ seconds. That is, the zero path ($n=0$) will have some inherent delay time $t_0$. The next path time length will be $t=t_0+(1)\times(1.5)\times 10^{-8}$ seconds, etc. The $n$th path will then have a time length of $t_0+(n)\times(1.5)\times 10^{-8}$ seconds. The velocity of light is three meters per $10^{-8}$ seconds, or 118 inches per $10^{-8}$ seconds, so that the distance increments between successive light paths in the relay delay system must be 177 inches. That is, $x=x_0+(n)\times(177)$ inches where $x$ is path length, $x_0$ is the path length of the zero path, and $n$ is the number of the path.

Relaying is accomplished within system 13 by use of spherical mirrors working at 1:1 conjugates and off axis by sufficient amounts adequate to enable the reflected images to clear the original image. Mirror radii must be one-half the total time delay path required; for example, for the $n=0$ path, no spherical mirror is necessary.

For $n=1$     radius=88.5 inches
For $n=2$     radius=177 inches
For $n=3$     radius=265.5 inches It is particularly important to note that the above three paths are variously utilized in combination to provide the remaining paths of the relay delay system. More explicity, the $n=4$ path is provided by running the image thereof consecutively through the $n=3$ and $n=1$ paths, thus using the same mirrors therein. The $n=5$ path utilizes the $n=3$ and $n=2$ paths, consecutively. The individual relay paths of the optical delay system 13 are illustrated in FIGURES 3, 4, and 5. Since all relaying is done in multiples of 177-inch path lengths, the distance from one end to the other end of the delay system 13 (FIGURE 1) equals one-half of 177 inches, or 88.5 inches. Moreover, in the interest of compactness, it is to be noted that in the actual physical construction, the image path entrance and exit to the delay system 13 are located at the same end thereof. That is, rather than making the physical length of the delay system 13 a prohibitive 177 inches, the system 13 of FIGURE 1 is in actual construction (and in FIGURES 3, 4, 5 and 6), folded back upon itself to thus present a physical length of ½ of 177 inches, or 88.5 inches. Thus, entrance plane 12 and exit plane 14 of FIGURE 1 are coplanar in actual construction of the camera, such planes being shown as individual planes in FIGURE 1 for purposes of illustration and in order to simplify the description of the overall camera system.

Considering now, in detail, the preferred structure of the delay system 13 which facilitates the provision of the individual image paths of previous mention, FIGURE 3 depicts the $n=1$ path, wherein field lenses 34 and 36 are mounted on the common plane consisting of coplanar image planes 12 and 14. Field lens 34 provides for entrance to the delay system 13 of the image path originating at the event being viewed, and field lens 36 provides for exit of such image path from the delay system. Arrows 37 represent the orientation of the event image at the focal points of the respective lenses. A relay mirror 38, located at the opposite end of the physical relay delay system (and which would schematically actually appear at the center of delay system 13 between planes 12 and 14 as shown on FIGURE 1), is a spherical mirror with a radius of 88.5 inches. Images of the event, as seen by the $n=1$ path viewing configuration, will appear at the input field lens 34, be relayed by relay mirror 38, and refocused at field lens 36, to exit therefrom. The image path at the input and exit of the delay system 13 is roughly parallel to the optical axis for convenience in design. Thus, the field lenses must be mounted off axis by an amount proportional to the ratio of the field lens conjugates. Since the 40-inch lenses are used in the image-forming system 27 as external relays into the system 13, the shift is about one-half the width of the image. The $n=1$ delay path gives an image delay of $1.5 \times 10^{-8}$ seconds. Such delay is, in actually, the interframe time, as will become apparent in the ensuing description.

FIGURE 4 shows the $n=2$ relay path in detail with a time delay of $3 \times 10^{-8}$ seconds. A field lens 39 and a field lens 41 are mounted in the entrance plane 12 and exit plane 14, respectively. The image path enters field lens 39, is focused therefrom upon a flat mirror 42, reflected to a relay mirror 43 in plane 12, 14, reflected therefrom to a flat mirror 44 located in the plane of mirror 42, and reflected upon field lens 41, to exit therefrom. Again, arrows 37 represent the orientation of the event image at the lens focal points. Notice in FIGURE 4 the field lenses 39 and 41 are mounted on their optical axis. That is, the image path leaving lens 39 and the image path entering lens 41 are each perpendicular to their respective lens. Relay mirror 43 has a radius of 177 inches, as per previous mention.

Referring now to FIGURE 5, there is shown the $n=3$ relay path with a delay of $4.5 \times 10^{-8}$ seconds. Again, field lenses 46 and 47 are mounted on the common planes 12 and 14. The image of event 11, as viewed by the $n=3$ path microscope shown in system 27, enters field lens 46 is reflected from a flat mirror 48 to a flat mirror 49, and from there to a relay mirror 51. Mirror 51 directs the path to a flat mirror 52 and then to a flat mirror 53 which then directs the image path through the field lens 47 to exit therefrom. Image orientation at lens focal points are again represented by arrows 37. Again, field lenses 46 and 47 are mounted on their optical axes, thereby placing the respective paths perpendicular to the lenses. The relay mirror 51, employed in the $n=3$ relay path, has a radius of 265.5 inches.

Figure 6:
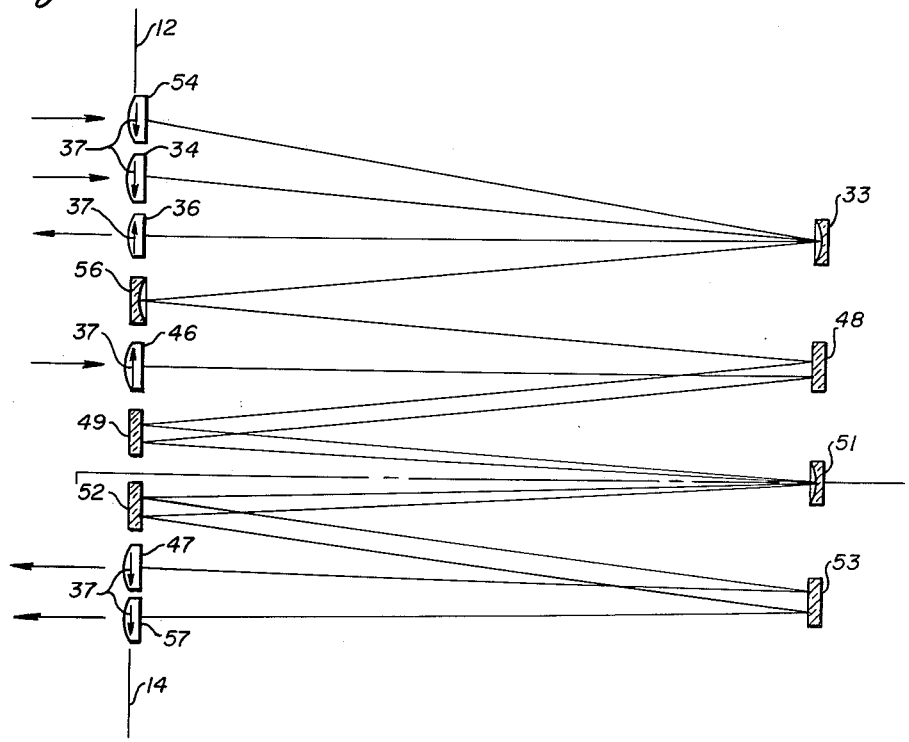

Referring next to FIGURE 6, there is shown the $n=4$ relay path with a delay of $6 \times 10^{-8}$ seconds. This path is unlike the previously described paths in that it does not entirely utilize its own optical components, but mainly uses, instead, the $1.5 \times 10^{-8}$ seconds ($n=1$) and the $4.5 \times 10^{-8}$ seconds ($n=3$) paths of previous description, in consecutive order. Thus, the image path enters a field lens 54 and is reflected from the relay mirror 33 to image upon a field mirror 56, which mirror 56 accomplishes a transfer of the image path from the $1.5 \times 10^{-8}$ seconds ($n=1$) path optics to the $4.5 \times 10^{-8}$ seconds ($n=3$) path optics, thereby providing the $6 \times 10^{-8}$ seconds path ($n=4$). The field mirror 56 reflects the image path upon the flat mirror 48 of the $4.5 \times 10^{-8}$ seconds, path, and the path thereafter is to the flat mirror 49, back to the relay mirror 51, the flat mirror 52, the flat mirror 53, and from there to a field lens 57, which provides a path exit therefrom. Field lenses 54 and 57 are again mounted on coplanar entrance plane 12 and exit plane 14. Note that although FIGURE 6 indicates the two relay mirrors 33 and 51 to be coplanar, they may be disposed in mutually perpendicular planes. That is, the $6 \times 10^{-8}$ seconds path is not necessarily constructed in two dimensions only, but may be constructed in three dimensions, as likewise, may any of the delay paths. Such construction gives more flexibility in assembling these paths in a minimum of space and with a minimum of complexity. (However, it is to be noted that each of the 6 paths herein described may utilize a separate configuration of optical lens and mirrors, if such configuration is more desirable.) The field lenses 54 and 57 are mounted in off-axis configuration, unlike that previously described in FIGURES 4 and 5. That is, lens 54 is not mounted perpendicular to the transmitted path emerging therefrom, and lens 57 is not perpendicular to the incoming path from mirror 53.

The $n=5$ delay path (not shown) with a delay of $7.5 \times 10^{-8}$ seconds uses the $3 \times 10^{-8}$ seconds and $4.5 \times 10^{-8}$ delay paths consecutively, in the same manner as that employed in forming the $6 \times 10^{-8}$ seconds path described supra. Thus, the $4.5 \times 10^{-8}$ seconds path has the function of relaying three side-by-side images.

Attention is directed to the fact that the $n=0$ delay path is not shown or described. This is due to the fact that such delay line does not actually enter the delay system 13, but, instead, is projected onto the plane 12 by the image forming system 27, and reflected directly therefrom by means of mirrors (not shown) to pass through the Kerr cell shutter 18. Thus, the $n=0$ image path, though possessing an actual length, is utilized as the zero time delay or reference path for the remaining 5 delay paths. All time measurements and delays as set forth in the present invention, are, therefore, relative to the $n=0$ delay path.

Although parallel output paths from the exit field lenses have been shown on the FIGURES 3, 4, 5, 6, such is merely for illustrative purposes inasmuch as the paths will not necessarily be parallel in actual practice. More specifically, in order to transmit the paths through the small aperture of the Kerr cell 18 and onto the film plane 16 (FIGURE 1) the field lenses 36, 41, 47, 57 at the exit end of the delay system 13 must provide directed paths therefrom, as depicted in FIGURE 1. If the exit paths were parallel they would, due to physical limitations, be too widespread to enter the Kerr cell aperture. In actual practice, an image-path directing flat mirror system may be employed to accept the image paths from the exit field lenses on plane 14 and to direct them through the Kerr cell shutter 18.

The Kerr cell, preferably used in the present invention is a conventional electro-optical KSC–50 with an effective exposure time of $5 \times 10^{-9}$ seconds, the time of which is not unique. On the other hand, this specific Kerr cell is capable of synchronization with possibly $3 \times 10^{-9}$ seconds, which is unique at the present time. Briefly, the Kerr cell aperture is 2 centimeters by 4 centimeters on the narrow end and 3 centimeters by 4 centimeters on the wide end. This is actually larger than is necessary for use in the present invention. Cell transmission is about 25% full-open and about $10^{-5}$% full-closed. These values are for mechanical operation of the polarizers therein. Since the Kerr cell effect is well known in the prior art, as are electrical synchronizing circuits of the type utilized as circuit 23, detailed discussions of these components are not set forth herein.

In operation, the sequence of events, with respect to time as taught by the present invention, may be further understood by referring to FIGURES 7a, 7b, and 7c. For simplicity of description, the operation of the present invention will be described hereinafter as photographing an event 11 comprising, in particular, an exploding wire. FIGURE 7a depicts such an exploding wire phenomena occurring in terms of relative radius of the event versus time. Such event is initiated at time $t_0$ and progresses to $t_3$. The period of the event to be actually photographed is an intermediate period ranging from time $t_1$ to time $t_2$. Thus, the Kerr cell camera, described hereinbefore, will take six spaced photos or frames during the period between time $t_1$ and $t_2$. The interframe times are created by the delay paths previously described. The correlating framing sequence is shown in FIGURE 7b. FIGURE 7c shows the Kerr cell exposure timing necessary to obtain the photo sequence during the period $t_1$ to $t_2$. Attention is directed to the fact that the Kerr cell is not opened until the end of the period to be photographed. That is, at time $t_2$ the Kerr cell is pulsed open. Simultaneously, while the Kerr cell is open, all six images relayed by the delay system 13 are focused upon the camera film plane 16. In other words, what is seen by the camera 17 in one exposure of the Kerr cell shutter is six photos of the event as it has occurred at successive equal increments during the preceding time period $t_1$–$t_2$.

To explain further, the following is the timing sequence as taught by the present invention, wherein the Kerr cell shutter opens at time $t_2$. At such time, $t_2$ frame 58 of FIGURE 7b is an image of the event as the latter is actually occurring. At time $t_2$, frames 61, 63, 64, 66, and 67 are simultaneously focused and exposed upon film plane 16. However, frame 61 is seeing the event as it occurred an interframe time 59 preceding the exposure. That is, frame 61 is viewed by the film plane during the single time interval that the Kerr cell is open, but due to the delay built into the $1.5 \times 10^{-8}$ seconds path of the relay delay system 13, the image has been traveling further than that of frame 58. Thus, the camera simultaneously views six images of the event 11 as it has been occurring, wherein the respective images have been successively delayed in $1.5 \times 10^{-8}$ seconds increments by means of successively longer optical paths. Therefore, frame 63 has been delayed twice as long as frame 61 (such delay graphically shown as interframes times 59 and 62). The same is true of frames 64, 66, and 67 where each successive frame has an added delay of $1.5 \times 10^{-8}$ seconds interframe time in its delay path. Thus, film plane 16 in the camera 17 simultaneously records six frames side-by-side with, however, each frame being successively separated in time from the next by a time interval of $1.5 \times 10^{-8}$ seconds in the event sequence.

While the invention has been disclosed herein with respect to a single preferred embodiment, it will be apparent that numerous modifications and variations may be made within the spirit and scope of the invention and, thus, it is not intended to limit the invention except by the terms of the following claims.

What is claimed is:

1. In a high speed framing camera for photographing high speed phenomena the combination comprising image forming means disposed to view said phenomena and form a plurality of images thereof, optical delay means including a plurality of image reflector sets disposed at the exit of said image forming means to receive and transmit said plurality of images along image paths of successively increasing transmission time duration increments in whole multiples of the first image path time duration, shutter means disposed at the exit of said optical delay means in blocking relation to said image paths to transmit the plurality of images respectively received therefrom through the shutter means upon actuation thereof, recording means disposed to receive the transmitted images from said shutter means and record same, and shutter actuating means operable in response to said phenomena for initiating and synchronizing the actuation of said shutter means and the occurrence of said phenomena in a predetermined time relation.

2. The combination according to claim 1 wherein said image forming means comprises a plurality of microscopic objectives disposed about said phenomena to be photographed to view and form images thereof, and image reflecting mirror means disposed to receive the plurality of images from said objectives and orient same for transmission along the image paths of said optical delay means.

3. The combination according to claim 1 wherein said optical delay means comprises a first set of optical components mounted to receive said plurality of images from said image forming means, a second set of optical components mounted in spatially opposed relation to said first set of optical components to receive and reflect the images therefrom, and a third set of optical components to receive the reflected images from said second set of optical components and transmit same therefrom in the direction of said shutter means, said first, second, and third sets of optical components defining said plurality of image paths of successively increasing transmission time duration increments.

4. The combination according to claim 1 wherein said image paths include paths of relatively long transmission time durations that are combinations of paths of shorter time duration, the lengths of the longer paths being equal to the summation of lengths of the shorter paths combined.

5. The combination according to claim 1 wherein said optical image forming means comprises a plurality of telescopic objectives disposed at a relatively long distance from said phenomena to form said plurality of images for transmission to said optical delay means.

6. In a high speed framing camera for photographing a high speed event the combination comprising a plurality of optical objectives arranged to view the event and form images thereof, a multichannel optical relay delay means with entrance and exit and disposed to receive said images at the entrance, the successive optical channels of said relay delay means having optical paths of successively increasing length in whole multiples of the first channel optical path length, optical focusing means disposed at the exit of said delay means to transmit images transmitted through the channels thereof in a converging configuration, a Kerr cell shutter disposed to receive the images from said focusing means and transmit them upon actuation, camera means disposed to receive and photograph the images transmitted by said Kerr cell shutter, and electronic circuit means for synchronizing the event and actuation of said Kerr cell shutter in a predetermined time relation.

References Cited in the file of this patent

UNITED STATES PATENTS 2,961,918    Nadig et al. _____ Nov. 29, 1960